United States Patent [19]
Kenney et al.

[11] Patent Number: 5,957,329
[45] Date of Patent: Sep. 28, 1999

[54] METERED WINDSHIELD WASHER FLUID DISPENSING SYSTEM

[76] Inventors: David J. Kenney; Rebecca B. Kenney, both of 3907 - 4th Ave., NE., Bradenton, Fla. 34208

[21] Appl. No.: 09/039,855

[22] Filed: Mar. 16, 1998

[51] Int. Cl.$^6$ ...................................................... B67B 7/00
[52] U.S. Cl. ..................................... 222/1; 222/2; 222/14
[58] Field of Search ................................ 222/1, 2, 14, 71, 222/73, 75, 173, 135, 192, 330; 137/1

[56] References Cited

U.S. PATENT DOCUMENTS

| | | | |
|---|---|---|---|
| 4,880,144 | 11/1989 | Shea | 222/173 |
| 5,018,645 | 5/1991 | Zinsmeyer | 222/14 |
| 5,088,621 | 2/1992 | Thompson et al. | 222/1 |
| 5,349,980 | 9/1994 | Spiegel | 137/1 |
| 5,497,914 | 3/1996 | Maltsis | 222/135 |

*Primary Examiner*—Andres Kashnikow
*Assistant Examiner*—Dinh Q. Nguyen
*Attorney, Agent, or Firm*—Dorothy S. Morse

[57] ABSTRACT

A coin and credit card activated windshield washer solution dispensing system for use at car washes, convenience stores, and gas stations by the public through which an operator can neatly transfer a metered amount of windshield washer solution directly into a motor vehicle's windshield washer fluid reservoir without the use of a funnel. The system can be housed as a independent, stand-alone unit or combined in a housing with other automotive-related service systems, such as air/vacuum service units. The present invention can comprise an air compressor to help provide even fluid flow, or in the alternative it can be gravity-fed. The compressor-driven embodiment comprises a fluid tank, a pump, a pressure regulator, a regulator gauge, an adjustable timer, a solenoid, access to a remote power supply, a step-down transformer, and an elongated dispensing nozzle with a shut-off control that is easily operable by customers to prevent overfill. Through use of the variable timer and pressure regulator, the person maintaining the system can precisely calibrate a maximum amount of fluid to be dispensed per unit cost and the speed of such dispensing. Applications of the system may also include, but are not limited to, use in large garages and car rental facilities for rapid spill-free filling of vehicle windshield washer fluid reservoirs.

20 Claims, 6 Drawing Sheets

METERED WINDSHIELD WASHER FLUID DISPENSING SYSTEM

BACKGROUND—FIELD OF INVENTION

This invention relates to coin operated dispensers, specifically to a coin or credit card activated windshield washer fluid dispensing system for use at car washes, convenience stores, and gas stations by the public, through which an operator can neatly transfer a metered amount of windshield washer solution under low pressure directly into the windshield washer fluid reservoir of a motor vehicle without the use of a funnel and without spillage. Applications may also include, but are not be limited to, use in large automobile and bus garages, as well as use in rental car facilities, for rapid spill-free dispensing of windshield washer solution into vehicle reservoirs.

BACKGROUND—DESCRIPTION OF PRIOR ART

During operation of motor vehicles, it is extremely important for a vehicle's front windshield to provide clear visibility of the roadway ahead. As a result, motor vehicles are equipped with windshield wipers and a reservoir of windshield washer solution specifically formulated to rapidly dissolve road dirt and grime. However, many motorists do not fully appreciate the safety advantage provided by their windshield washer fluid reservoir and they neglect to regularly check its fluid level. As a result, motorists often find that there is no windshield washer solution available to them when they need it. As most motorists do not carry with them an independent supply of windshield washer solution for such occasions, or even a container of water, they continue to repeatedly drive with diminished visibility and compromise the safety of everyone on the road with them.

One way to solve this problem would be to have windshield washer solution dispensers available in facilities where motorists regularly service their vehicles, such as car washes, convenience stores, and gas stations. If the dispensers were accessible to motorists at each designated servicing location at a car wash, convenience store, or gas station, or in the alternative if the windshield washer solution dispensers were positioned elsewhere on the car wash, convenience store, or gas station property but easily visible to motorists from the designated servicing locations, the dispensers would act as reminders for motorists to regularly check the fluid level in their windshield washer fluid reservoirs. Further, if the dispensers for windshield washer solution were easy to operate by the public, promptly delivered windshield washer solution in a reasonable amount of time, were able to neatly dispense windshield washer solution directly into the vehicle's reservoir without splashing and without the use of a funnel, and had provisions for steady and even fluid flow which the operator could promptly cut-off as needed to prevent overfill, motorists would be likely to use them. Although retail stores selling automotive supplies and accessories generally sell gallon containers of windshield washer solution at a reasonable price, even motorists who remember to buy it often fail to add it to their windshield washer fluid reservoirs on a regular basis. Further, in addition to enhancing the ability for motorists to have clean windshields while driving, such dispensers would enhance environmental clean-up efforts by eliminating the need for disposable plastic containers to distribute windshield washer solution, containers which are not always recycled. It is not known to have a dispenser system dedicated to the function of providing small amounts of windshield washer solution to motorists which can be conveniently placed adjacent to designated servicing locations at car washes, convenience stores, and gas stations to remind motorists to regularly add windshield washer solution to their reservoirs and which is easy to use and neatly transfers a low-pressure metered flow of windshield washer solution directly into a vehicle reservoir without use of a funnel and without spillage.

The prior art believed to be the most closely related to the present invention is the invention in U.S. Pat. No. 5,497,914 to Maltsis (1996). However, the present invention can be distinguished from the Matsis invention in many ways. The Maltsis invention contemplates a coin-operated self-service device for spraying a plurality of cleaning products mixed with compressed air through a spray gun. In the Maltsis invention each cleaning product may be delivered through a dedicated spray gun, or in the alternative all products can be delivered through the same spray gun attachment. The Maltsis spray guns are each attached to a reeled hose and made available to customers through an opening in the front of the invention's housing. The Maltsis spray gun also contemplates a separate pump to feed each spray gun with cleaning product and a common motor operating all of the pumps. In contrast, the present invention is contemplated either as a multiple-nozzle dispensing system that can provide windshield washer solution simultaneously to a plurality of designated servicing locations at a car wash, convenience store, or a gas station, either through overhead access when servicing locations are non-partitioned or when servicing bays separated by partitions through a wall-mounted unit connected between adjacent servicing bays. It is further contemplated for the present invention to also be configured as a stand-alone unit which functions independently or in combination with other service systems commonly found at car washes, convenience stores, and gas stations, such as vacuum and air dispensing systems. While the Maltsis invention provides its hose on a reel, the present invention contemplates a holster for its dispensing nozzle so that the nozzle itself helps to support its attached hose. The present invention also contemplates an embodiment in which the windshield washer solution is gravity fed instead of being caused to flow through the use of an air compressor. Further the present invention contemplates the use of a step-down transformer for supplying power to its solenoids, timers, and coin acceptors, as well as the use of a gauged pressure regulator for assisting the vendor in adjusting washer solution flow so that the flow is even and steady to provide optimum, splash-free delivery of a predetermined amount of windshield washer solution directly into a vehicle's reservoir. Also, the Maltsis invention provides a motor for operating its pumps and a mixing device between its compressed air reservoir and the pumps, while in contrast the present invention simply provides for a pump which draws in both air and solution at low pressure to provide a precise metered flow of windshield washer solution for splash-free dispensing without the need for a separate mixing device. The present invention is further distinguishable from the Maltsis invention by providing an elongated nozzle for its dispensing gun of sufficient length so that the tip of the nozzle can easily reach into a vehicle windshield washer fluid reservoir to fill it without spillage. Also, the nozzle of the present invention is a dispensing nozzle which causes an even, low-pressure flow of windshield washer solution, and not a spray nozzle. It is not known in this field to have a coin or credit card activated windshield washer solution dispensing system for use at car washes, convenience stores, and gas stations by the public, which comprises a gauged low-pressure regulator; a step-down transformer for providing power to a timer, a solenoid, and a coin acceptor; a supply of windshield washer solution in direct fluid communication with either a solenoid or a pump; a gun holster; and a dispensing gun with a flow cut-off control and an elongated nozzle through which an operator can neatly furnish a metered amount of windshield washer solution under low pressure directly into the windshield solution reservoir of a motor vehicle without the use of a funnel and without spillage.

SUMMARY OF INVENTION—OBJECTS AND ADVANTAGES

It is the primary object of this invention to provide a metered windshield washer solution dispensing system for use by the public at car washes, convenience stores, and gas stations. It is also an object of this invention that the windshield washer solution dispensing system be coin and/or credit card operated. A further object of this invention is to provide a windshield washer solution dispensing system which operates under low pressure for gentle operation to furnish a steady even flow of windshield washer solution. It is also an object of this invention to provide a windshield washer solution dispensing system that can be used to directly fill the windshield washer reservoir of a motor vehicle without the use of a funnel. A further object of this invention is to provide a windshield washer solution dispensing system which can be either gravity fed or operated through the use of an air compressor and pump. It is also an object of this invention to provide a windshield washer solution dispensing system wherein the pressure and dispensing time can be easily calibrated by the vendor. A further object of this invention is to provide a windshield washer solution dispensing system in which flow of fluid can be easily turned on and shut off by the customer to prevent spillage. It is also an object of this invention to provide a quiet windshield washer solution dispensing system that is easy for a customer to use. A further object of this invention is to provide a windshield washer solution dispensing system which causes no spray, mess, or waste during proper customer use. It is also an object of this invention to provide a windshield washer solution dispensing system that allows a customer to expediently fill the windshield washer reservoir of a motor vehicle. A further object of this invention is to provide an environmentally friendly windshield washer solution dispensing system which reduces the widespread use of disposable plastic containers for the temporary storage of small amounts of washer solution. It is also a further object of this invention to provide a windshield washer solution dispensing system that can be incorporated into the type of coin operated systems already in use at gas stations, convenience stores, and car washes, such as those already delivering air and vacuum services.

As described herein, properly manufactured and used, the present invention would provide a means by which motorists could neatly refill the windshield washer fluid reservoirs in their vehicles on a regular basis without use of a funnel and without spillage. Conspicuous placement near to vehicle servicing locations at car washes, gas stations, and convenience stores would help to remind motorists to refill their windshield washer fluid reservoirs at the same time they refuel or provide other services to their vehicle. The present invention could be used as a stand-alone unit with one or more dispensing guns attached thereto, placed within a housing that contains other vehicle-servicing equipment such as that providing air and vacuum services to a vehicle, or mounted to a wall in a partitioned servicing area such as a car wash wherein a plurality of connected hoses would allow a dispensing gun to provide windshield washer solution to each of the servicing locations within the partitioned area. One embodiment of the present invention would comprise a housing, a container of windshield washer solution positioned within the housing, a pump, a first hose connected between the container and the pump, a solenoid, a low pressure regulator, a timer, a step-down transformer, an alternating current power cord and plug, a dispensing gun with an elongated nozzle, and means for supporting the dispensing gun during periods of non-use. The distal end of the nozzle would be sufficiently small to fit within the opening in most windshield washer reservoirs. The present invention would also comprise a means for causing the windshield washer solution to flow into the pump for transfer through a second hose to the gun for dispensing. It is contemplated for such means to comprise an air compressor or for the container of windshield washer solution to be placed into an elevated position within the housing so as to make the present invention gravity-fed. The gravity-fed embodiment would not require an air compressor, nor a regulator, regulator gauge, nor pump. The dispensing gun of all embodiments would have a cut-off control that is easily operable by a motorist to prevent overfill of a vehicle windshield washer fluid reservoir and spillage. It is also contemplated for the present invention to be coin-operated or operated through the use of a credit or debit card, or all three. Activation of the present invention by insertion therein of a coin or credit card, would cause dispensing of a calibrated flow of windshield washer solution for a pre-determined period of time. Through adjustment of either the regulator or the timer, the system of the present invention could be calibrated to dispense differing amounts of windshield washer solution for a givens cost and it would be the choice of the system owner as to the unit amount of windshield washer solution dispensed. If the system was calibrated by its owner to fill an average vehicle reservoir to an approximate ninety percent fluid capacity, and the reservoir to be filled was already one-third full, the operator would have to manipulate the nozzle cut-off control until the system again became inactive to prevent overfill of the reservoir. In contrast, if the system was calibrated to fill vehicle reservoirs to an approximate fifty percent capacity, and the reservoir to be filled was already one-fourth full, the operator could choose whether to add one dispensed amount of windshield washer solution without use of the nozzle cut-off control, or to pay for a second timed period of dispensing and manipulate the nozzle cut-off control when the reservoir became full to prevent spillage. To confirm operation and thereby help operators know when to release the nozzle cut-off control at the end of the dispensing period, an on-off light on the front of the electrical enclosure would become illuminated during dispensing and cease to be illuminated when dispensing had stopped. Thus, the present invention would provide for quiet and expedient filling of a motor vehicle windshield washer fluid reservoir, with no spray, no mess, and no waste.

The description herein provides preferred embodiments of the present invention but should not be construed as limiting the scope of the windshield washer solution dispensing system invention. For example, variations in the number of dispensing guns and holsters used, the length dimension of hoses used, the capacity of the fluid tank for holding the windshield washer solution, the type of the pump used, the dimension and configuration of pump used, and the dimension of the air compressor used, other than those shown and described herein, may be incorporated into the present invention. Thus the scope of the present invention should be determined by the appended claims and their legal equivalents, rather than the examples given.

DETAILED DESCRIPTION OF PREFERRED EMBODIMENTS

Figure 1:
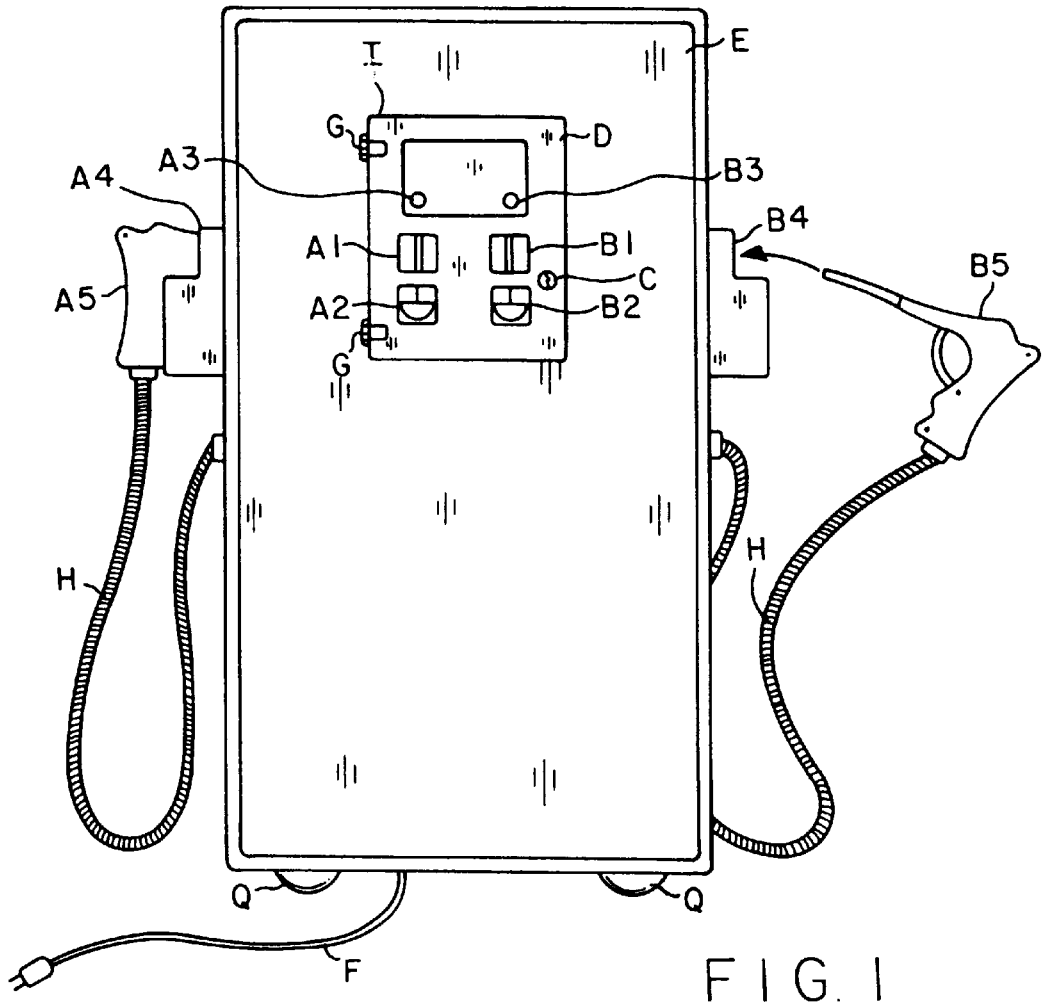
FIG. 1 is a front view of the cabinet of a first stand-alone embodiment of the invention with two dispensing nozzles attached thereto.

FIG. 1 shows a first preferred embodiment of a stand-alone, metered Glass Wizard windshield washer fluid dispensing system having a cabinet E, feet Q supporting cabinet E, a pair of holsters A4 and B4 attached to the sides of cabinet E, and an electrical enclosure I connected through the front surface of cabinet E. The type of feet Q used is not critical. Also, instead of feet Q, cabinet E may be bolted to a secure surface (not shown) to deter theft and vandalism, or have wheels or rollers (not shown). Also, although not critical, in the first preferred embodiment it is contemplated for cabinet E to have width, depth, and height dimensions of approximately three feet, three feet, and six feet, respectively, and for electrical enclosure I to have width, depth, and height dimensions of approximately twelve inches, six inches, and ten inches, respectively.

FIG. 1 further shows the first embodiment having two gun control dispensing nozzles A5 and B5 each attached to cabinet E with separate hoses H, with nozzle A5 supported by holster A4. In contrast, FIG. 1 shows nozzle B5 ready for placement within holster B4. An electrical cord and plug F is also connected through cabinet E and configured for connection to a remote power source (not shown). In addition, electrical enclosure I is shown to have a front access door D with two hinges G connected between one side of front access door D and cabinet E. The number of hinges G used is not critical to the present invention. A lock C is positioned adjacent to the side of front access door D opposed from hinges G. The type of lock C used is not critical, but should be tamper-resistant and not too large so as to interfere with other devices on the face of front access door D. FIG. 1 also shows two on-off lights A3 and B3 positioned through front access door D, as well as two coin slots A1 and B1 and two coin returns A2 and B2. It is contemplated for on-off lights A3 and B3 to become illuminated during dispensing of windshield washer solution, identified by the letter P in FIGS. 3, 4, 5, and 8. The type of light source used for on-off lights A3 and B3 is not critical.

Figure 2:
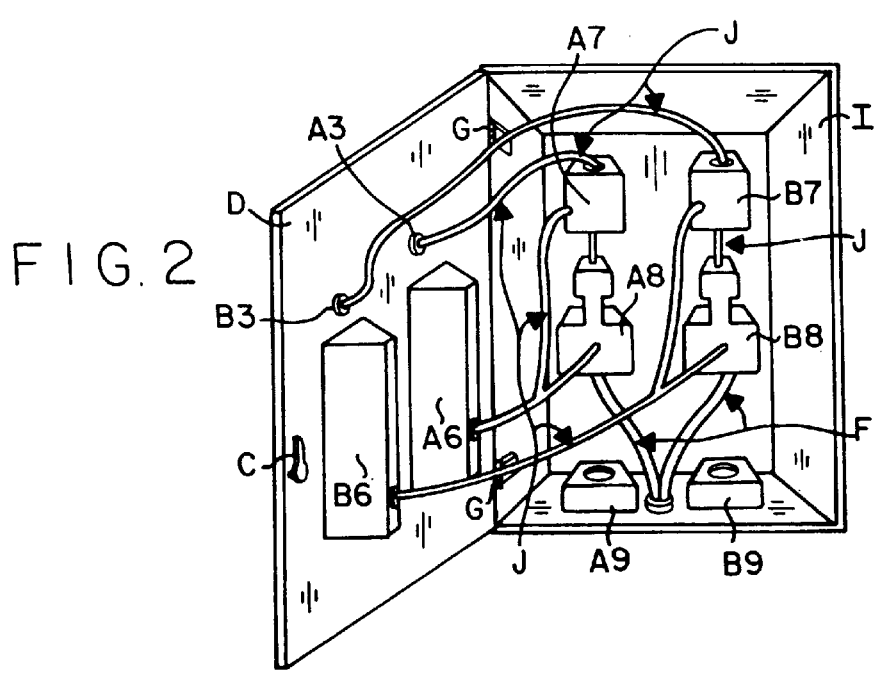
FIG. 2 is an enlarged front view of the electrical enclosure of the first embodiment of the invention.

However, when electrical cord and plug F is configured for connection to a remote 120-volt power source and the transformers shown in FIG. 2 as A8 and B8 are step-down transformers which reduce current from 120-volts to 24-volts, it is contemplated for on-off lights to comprise 24-volt light sources. The number of holsters such as A4 and B4, dispensing nozzles such as A5 and B5, hoses H, on-off lights such as A3 and B3, coin slots such as A1 and B1, and coin returns such as A2 and B2, used with cabinet E are not critical to the present invention as it is contemplated for cabinet E to house one metered dispensing system, or in the alternative to house several metered dispensing systems for simultaneous use by different operators (not shown).

The configuration and dimension of cabinet E is not critical to the present invention and it is contemplated for cabinet E to comprise rectangular, cylindrical, and other shaped housings. Also, the size of front access door D is not critical to the present invention as long as it allows convenient access to those of the system's components positioned within electrical enclosure I. The dimension of coin slots A1 and B1 and coin returns A2 and B2 are also not critical but should have sufficient dimension for ease of use. Although not shown, nozzles A5 and B5 each comprise a cut-off control which will allow an operator (not shown) the ability to quickly and easily stop the flow of fluid upon demand to prevent overfill and spillage of windshield washer solution, designated by the letter P in FIGS. 3, 4, 5, and 8. Also, in the present invention flow of fluid would be controlled as a function of time and not volume dispensed, to prevent waste.

FIG. 2 shows the interior of electrical enclosure I having hinges G connecting door D thereto and lock C connected to the edge of front access door D opposed from hinges G. Lock C would be necessary to safeguard money received in exchange for dispensed windshield washer solution, as well as to protect the components housed within electrical enclosure I from possible theft or vandalism. Electrical enclosure I and front access door D must also be made from strong, tamper-resistant materials for further safeguarding the money and components housed within electrical enclosure I.

FIG. 2 also shows coin acceptors A6 and B6 connected to the interior surface of front access door D, with coin vaults A9 and B9 strategically positioned within electrical enclosure I beneath the lower end of coin acceptors A6 and B6 respectively, for storing coins (not shown) placed into coin acceptors A6 and B6 until they can be removed by the person maintaining the system or the system's owner (not shown). FIG. 2 further shows electrical enclosure I housing two timers A7 and B7, as well as two step-down transformers A8 and B8, with wiring J connecting on-off lights A3 and B3 with timers A7 and B7 respectively, timers A7 and B7 with transformers A8 and B8 respectively, coin acceptors A6 and B6 respectively to transformers A8 and B8, and coin acceptors A6 and B6 respectively to timers A7 and B7. Transformers A8 and B8 are connected by power cord and plug F through an opening in the bottom of electrical enclosure I to a remote power supply (not shown). Although not critical, in the first preferred embodiment Questor II 8080-0002 24V coin acceptors would be provided for coin acceptors A6 and B6, Keltner research 9D timers would be provided for timers A7 and B7, and Dongan 33-10K Single Phase 50/60 HZ KVA 100 120 to 24V transformers would be provided for transformers A8 and B8.

In the preferred embodiment it is contemplated for step-down transformers A8 and B8 to each reduce line voltage from 120-volts to 24-volts, and for timers A7 and B7 to operate on 24-volt electricity. It is also contemplated for timers A7 and B7 to comprise adjustable timing units so that timers A7 and B7 can be used to help regulate the amount of fluid flow through nozzles A5 and B5 respectively. In the preferred embodiment it is further contemplated for on-off lights A3 and B3 to become activated during periods of dispensing windshield washing solution, shown in FIGS. 3, 4, 5, and 8 by the letter P, and to cease functioning when windshield washing solution dispensing has stopped. Although not shown in FIG. 2, it is contemplated for a credit card or debit card reader, such as the credit/debit card reader identified in FIGS. 7 and 8 by the letter V, to be substituted for, or work in conjunction with, either coin acceptor A6, coin acceptor B6, or both.

Figure 3:
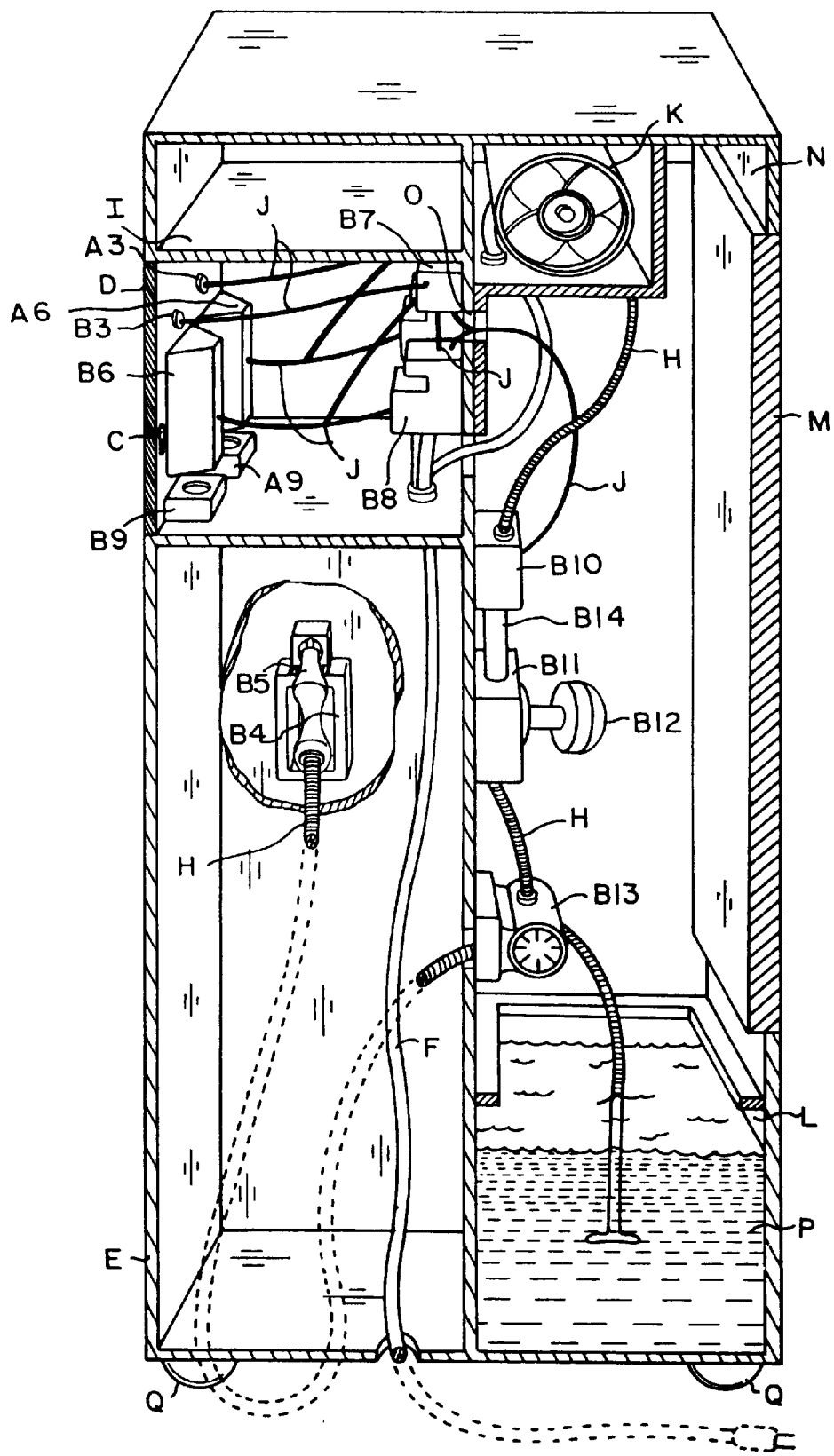
FIG. 3 is a sectional side view of the first embodiment of the invention having an air compressor and a pump.

FIG. 3 shows the present invention having cabinet E, feet Q supporting cabinet E, holster B4 attached to the side of cabinet E, and electrical enclosure I connected through the front surface of cabinet E. FIG. 3 further shows gun control dispensing nozzle B5 attached to cabinet E with a hose H, and nozzle B5 supported by holster B4. An electrical cord and plug F is also connected through cabinet E and configured for connection to a remote 120-volt power source (not shown). Both transformer B8 in electrical enclosure I and compressor K in component enclosure N, as well as transformer A8 which is hidden behind transformer B8, are connected directly to the remote 120-volt power supply with electrical cord and plug F. In addition, electrical enclosure I is shown to have front access door D attached thereto with lock C attached to one side of front access door D. FIG. 3 also shows two 24-volt on-off lights A3 and B3 positioned through front access door D, as well as two 24-volt coin acceptors A6 and B6, two coin vaults A9 and B9, a 24-volt timer B7, and a step-down transformer B8 which reduces current from 120-volts to 24-volts. Although hidden from view in FIG. 3, timer A7 and transformer A8 are positioned directly behind timer B7 and transformer B8, respectively. For clarity of illustration FIG. 3 intentionally shows wiring J interconnecting only on-off light B3, coin acceptor B6, timer B7, transformer B8, and solenoid B10. It should be assumed that duplicate wiring J would interconnect on-off light A3, coin acceptor A6, timer A7, transformer A8, and solenoid A10.

The number of holsters A4 and B4, dispensing nozzles A5 and B5, hoses H, on-off lights A3 and B3, coin acceptors A6 and B6, and coin vaults A9 and B9, used with cabinet E are not critical to the present invention as it is contemplated for cabinet E to house one metered dispensing system, or in the alternative to house several metered dispensing systems for simultaneous use by different operators. Although not shown, nozzle B5 comprises a cut-off control which will allow an operator the ability to quickly and easily stop the flow of fluid upon demand to prevent spillage of windshield washer solution P. FIG. 3 also shows the present invention having a rear component enclosure N with back access door M connected thereto. In addition, FIG. 3 shows compressor K positioned near the top of component enclosure N, with hose H connecting compressor K to solenoid B10. Although hidden from view in FIG. 3, a similar hose H connects compressor K to solenoid A10, which must be assumed to be positioned directly behind solenoid A10. Additional wiring J connects solenoid B10 to both timer B7 and step-down transformer B8 through opening O in the wall of component enclosure N opposed to back access door M. FIG. 3 further shows connector B14 attached between solenoid B10 and regulator B11, to provide flow of air therebetween. Regulator gauge B12 shown attached to regulator B11 allows measured operator adjustment of air flow through regulator B11. FIG. 3 also shows a first hose H connecting regulator B11 to pump B13, and a second hose H connecting pump B13 to fluid tank L containing windshield washer solution P. A third hose H is connected to pump B13 and shown to extend through the side wall of component enclosure N for connection to nozzle B5. As a result, upon system activation by insertion of a coin into coin acceptor B6, timer B7 would cause solenoid B10 to be opened for a predetermined period of time to draw air from compressor K into regulator B11, and subsequently into pump B13. Simultaneously, windshield washer solution P would be drawn upwardly into pump B13 where it would be mixed with the air (not shown) and transferred through the third hose H under low pressure to nozzle B5. In the first preferred embodiment, although not critical, Dema solenoid Valves 401 P 24/60 volts would be provided for solenoids A10 and B10, Norgren R06-221-NKA Inlet 400PSIG Outlet 100 PSIG regulators would be provided for regulators A11 and B11, regulators gauges A12 and B12 would be configured to regulate air flow between 0 PSI and 60 PSI, and Ingersoll Rand ½" Diaphragm 66605x-x pumps would be provided for pumps A13 and B13. Although FIG. 3 shows a diaphragm pump being used for pump B13 and diaphragm pumps would be preferred for pumps A13 and B13, it is within the contemplation of the present invention for pumps A13 and B13 to also comprise electrical pumps.

Figure 4:
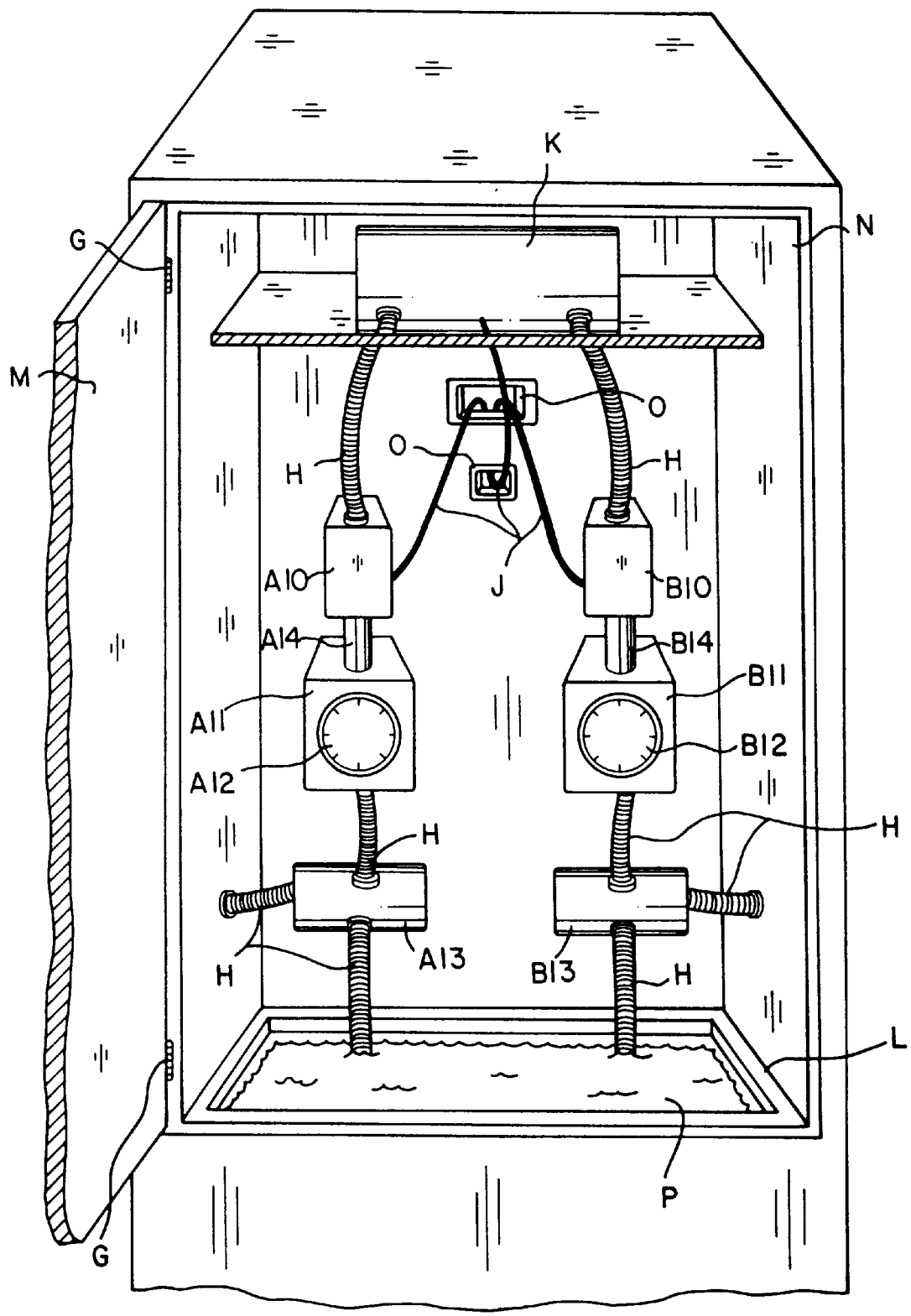
FIG. 4 is a sectional back view of the first embodiment of the invention.

FIG. 4 shows the first preferred embodiment of the present invention having a rear component enclosure N with back access door M connected thereto with two hinges G. The number of hinges G used is not critical. FIG. 4 shows compressor K placed in an elevated position near the top of component enclosure N, with first hoses H connecting compressor K to solenoids A10 and B10. In the preferred embodiment, although not critical, a Cambell Hausfeld 4.5 HP/20Gal compressor would be provided for compressor K. Electrical cord and plug F connects compressor K through a first opening O to a remote power supply source (not shown), while wiring J connects solenoids A10 and B10 to step-down transformers A8 and B8 and timers A7 and B7, respectively, through a second opening O in the wall of component enclosure N which is opposed to back access door M. FIG. 4 also shows connector A14 attached between solenoid A10 and regulator A11, and connector B14 attached between solenoid B10 and regulator B11, to provide air flow respectively therebetween. Regulator gauges A12 and B12 are attached respectively to regulators A11 and B11 to allow measured adjustment of air flow through regulators A11 and B11 by the person responsible for providing maintenance to the present invention (not shown). Second hoses H connect regulators A11 and B11 to pumps A13 and B13, respectively, and third hoses H connect pumps A13 and B13 to fluid tank L containing windshield washer solution P. Fourth hoses H connected to pumps A13 and B13 are shown to extend through the side walls of component enclosure N for connection to nozzles A5 and B5, respectively (not shown in FIG. 4). As a result, upon activation by insertion of a coin into coin acceptor B6, solenoid B10 would be opened for a predetermined period of time to draw air supplied by compressor K through regulator B11, and subsequently into pump B13. Simultaneously, windshield washer solution P would be drawn upward into pump B13 where it would be mixed with the air (not shown) and transferred through fourth hose H to nozzle B5.

Figure 5:
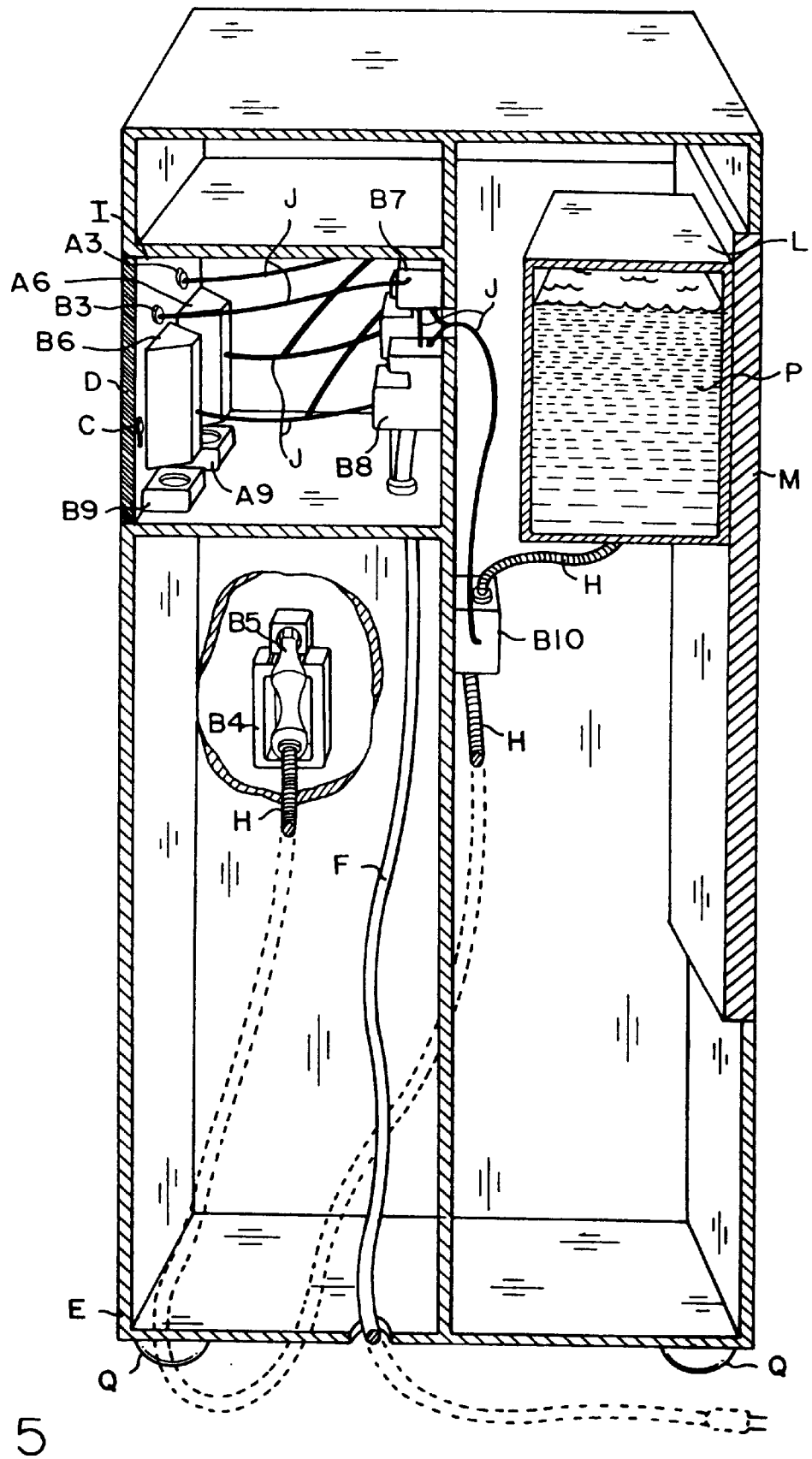
FIG. 5 is a sectional side view of a second embodiment of the invention which is gravityfed and has no compressor, regulator, regulator gauge, or pump.

FIG. 5 shows a second preferred embodiment of the metered Glass Wizard windshield washer fluid dispensing invention in which windshield washer solution P is gravity-fed through nozzle B5 for transfer into the windshield washer fluid reservoir of a motor vehicle (not shown). FIG. 5 shows the present invention having cabinet E, holster B4 attached to the side of cabinet E with nozzle B5 supported by holster B4 during periods of non-use. FIG. 5 also shows electrical enclosure I connected through the front surface of cabinet E and cabinet E having a back access door M. Accessible through back access door M are solenoid B10 and fluid tank L containing windshield washer solution P which is placed in an elevated position in the upper portion of cabinet E. In FIG. 5 solenoid A10 is hidden from view and would have similar hose H and wiring J connections as that shown for solenoid B10. Hoses H are connected between fluid tank L and solenoid B10, as well as between solenoid B10 and nozzle B5. In addition, FIG. 5 shows electrical enclosure I having front access door D, lock C on front access door D, coin acceptors A6 and B6 connected to the interior of front access door D, on-off lights A3 and B3 connected through front access door D, coin vaults A9 and B9 strategically positioned within electrical enclosure I beneath the bottom end of coin acceptors A6 and B6, step-down transformer B8, and timer B7. In FIG. 5 step-down transformer A8 and timer A7 are positioned behind step-down transformer B8 and timer B7, respectively, and hidden from view. Electrical wiring J interconnects on-off light A3 and B3 with timers A7 and B7 respectively, timers A7 and B7 with transformers A8 and B8 respectively, coin acceptors A6 and B6 to transformers A8 and B8 as well as timers A6 and B7 respectively, and timers A7 and B7 as well as transformers A8 and B8 through electrical enclosure I to solenoids A10 and B10 respectively. Transformers A8 and B8 are also connected to a remote power supply source (not shown) by electrical cord and plug F which extends through an opening in the bottom of electrical enclosure I. During operation, when a coin is inserted into coin acceptor B6, timer B7 is activated to open solenoid B10 for a pre-determined period of time, so that gravity then causes windshield washer solution P to flow through hose H and into nozzle B5 for transfer into the windshield washer fluid reservoir of a motor vehicle (not shown).

Figure 6:
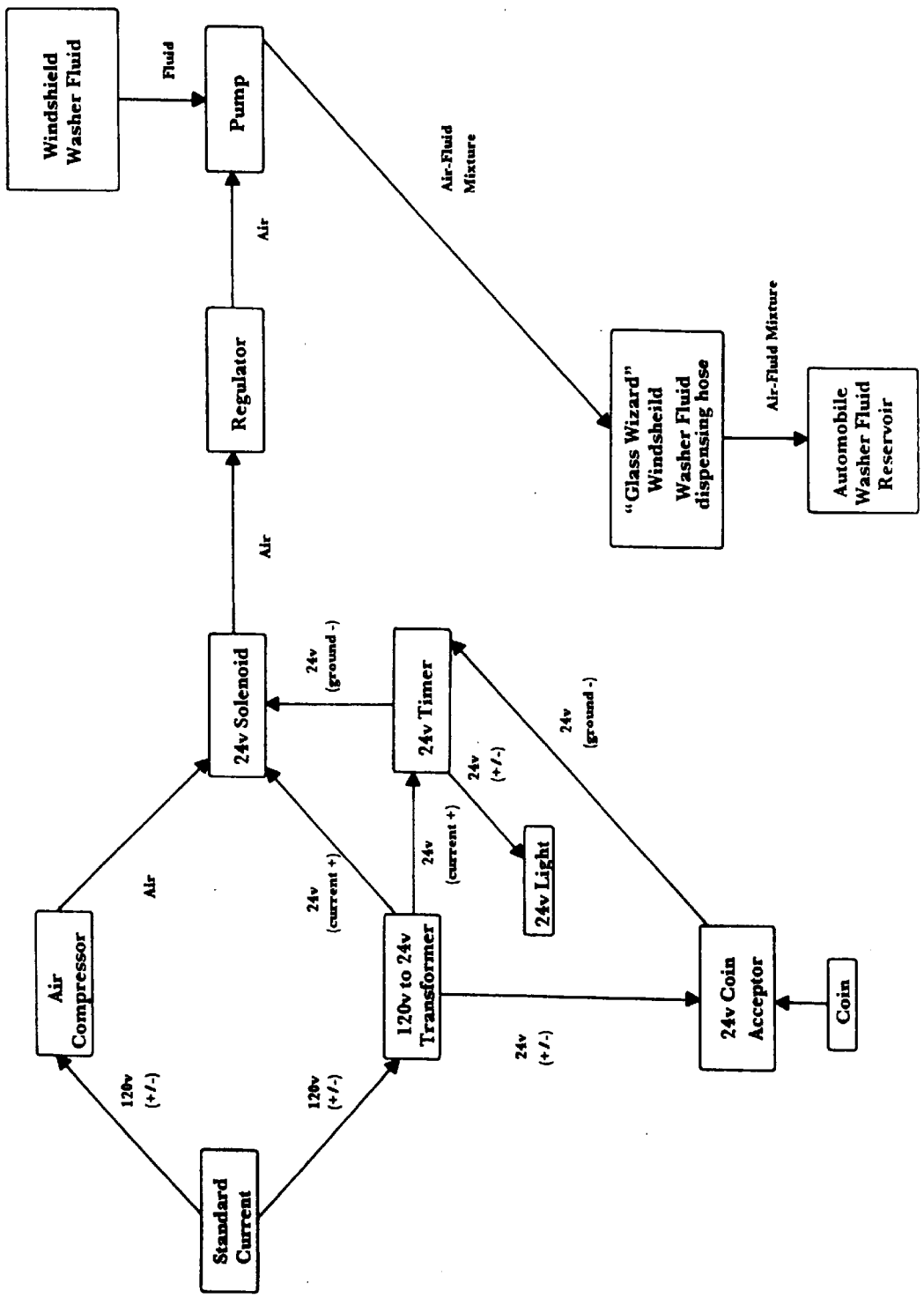
FIG. 6 is a schematic view of the first embodiment of the invention.

FIG. 6 shows that in the first embodiment of the present invention where it is contemplated for a 120-volt remote power supply source to be connected to the present invention, both the current and ground wires of wiring J would be connected between the 120-volt power supply source and air compressor K, as well as 120-volt to 24-volt step-down transformer A8 or B8 to provide each with standard 120-volt current. Both the current and ground wires of wiring J would also be connected between step-down transformer A8 or B8 and the respective 24-volt coin acceptor A6 or B6. Current wires only would be connected between step-down transformer A8 or B8 and the respective 24-volt timer A7 or B7, also between step-down transformer A8 and B8 and the respective 24-volt solenoid A10 or B10. Ground wires only would be connected between 24-volt timer A7 or B7 and the respective 24-volt coin acceptor A6 or B6, the respective 24-volt on-off light A3 or B3, and the respective 24-volt solenoid A10 or B10. Therefore, during use when a coin is placed into either coin acceptor A6 or B6, the respective transformer A8 or B8 is caused to provide 24-volt electricity to the respective timer A7 or B7, the respective on-off light A3 or B3, and the respective solenoid A10 or B10 for the predetermined period of time set by the respective timer A7 or B7. When timer A7 or B7 is thus activated, it causes the respective on-off light A3 or B3 to become illuminated, and causes the respective solenoid A10 or B10 to open for the pre-determined amount of time. The respective solenoid A10 or B10 then draws air (not shown) from compressor K, and forces it through the respective regulator A11 or B11, and into the respective pump A13 or B13. At the same time the respective pump A13 or B13 will draw windshield washer solution P from fluid tank L and mix the air and windshield washer solution P together prior to transferring such mixture under low pressure through hose H and into the respective nozzle A5 or B5 for neat and even dispensing thereof into the windshield washer fluid reservoir of a motor vehicle without spillage and without use of a funnel (not shown).

Figure 7:
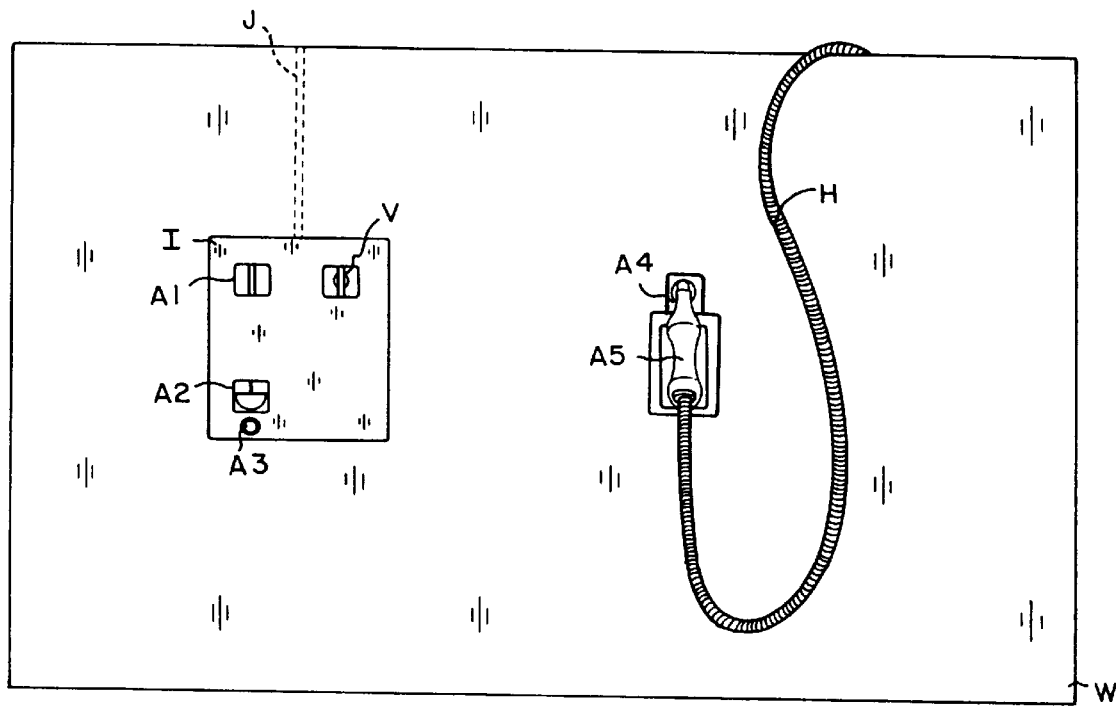
FIG. 7 is a front view of a third embodiment of the invention with an electrical enclosure and nozzle which are wall-mounted to a servicing area partition.

FIG. 7 shows a wall-mounted embodiment of the metered Glass Wizard windshield washer fluid dispensing invention wherein windshield washer solution P and electricity (not shown) are provided to nozzle A5 and electrical enclosure I, respectively, through various types of overhead delivery. FIG. 7 shows holster A4 being attached to wall-partition W, with nozzle A5 supported by holster A4. FIG. 7 shows one end of hose H connected to nozzle A5, with the other end of hose H extending over wall/partition W for remote connection to a pump, such as pumps A13 and B13, or a solenoid, such as solenoids A10 and B10 (none of which are shown in FIG. 7). Although not shown, it is also contemplated for the present invention to comprise an overhead support structure to support and/or interconnect the proximal ends of hoses H servicing several vehicle servicing sites, such as the partitioned servicing locations found typically in car washes, gas stations, and convenience stores. FIG. 7 further shows electrical enclosure I comprising coin slot A1, coin return A2, on-off light A3, and credit/debit card reader V, with wiring J connecting electrical enclosure I to a remote power supply source (not shown). At a minimum, although not shown, coin acceptors A6 and B6 and coin vaults A9 and B9 would be positioned within electrical enclosure I. Transformers A8 and B8 and timers A7 and B7 could be either positioned within electrical enclosure I, or remotely from electrical enclosure I. In the preferred embodiment transformers A8 and B8 and timers A7 and B7 would be either positioned remotely from electrical enclosure I to provide for smaller electrical enclosures I than would otherwise be needed. Also although not shown, it is contemplated for one electrical enclosure I to be connected through wall/partition W and configured for use by operators in adjacent servicing locations positioned on opposite sides of wall/partition W. As a result, coin slot A1, coin return A2, on-off light A3, and a first credit/debit card reader V could be located on the front side of electrical enclosure I for use by a first operator, while coin slot B1, coin return B2, on-off light B3, and a second credit/debit card reader V could be located on the back side of electrical enclosure I for use by a second operator in the adjacent vehicle servicing location on the other side of wall/partition W. A separate nozzle B5 would be supported by a separate holster B4, with holster B4 being attached to the other side of wall/partition W for use by the second operator in the adjacent vehicle servicing location. It would then be contemplated for electrical enclosure I to have either one or two doors D, as needed for maximum convenience in accessing the respective coin vaults A9 and B9 within electrical enclosure I.

Figure 8:
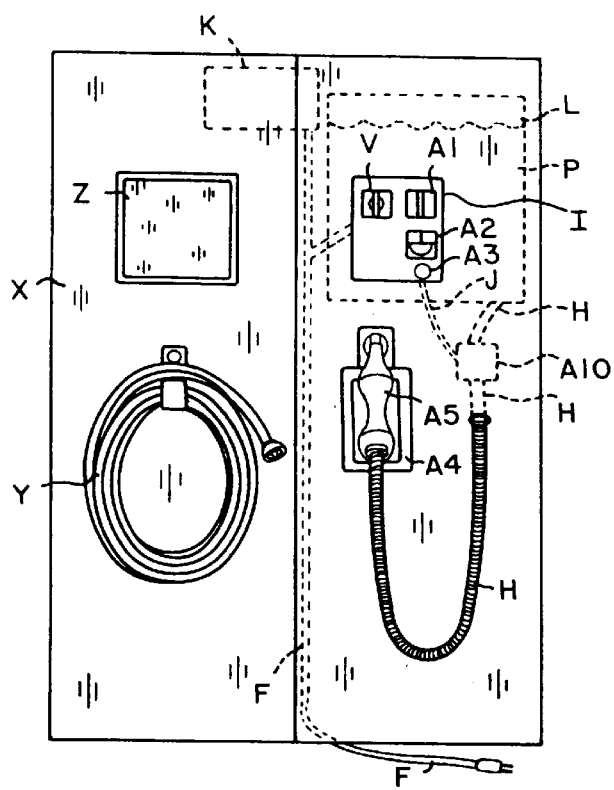
FIG. 8 is a front view of a fourth embodiment of the invention which is combined into a housing unit also offering air and vacuum service to a motorist.

FIG. 8 shows an embodiment of the metered Glass Wizard windshield washer fluid dispensing invention which shares a housing with air/vacuum service unit X that can be used for both filling vehicle tires with air to proper air pressure levels for safe use, as well as vacuuming the seats and carpeting in motor vehicle passenger compartments. FIG. 8 shows air/vacuum service unit X having an information display window Z and an air hose Y supported against the outside surface of air/vacuum service unit X. Connected thereto and sharing the same outer housing, FIG. 8 shows fluid tank L having windshield washer solution P placed in an elevated position within the upper portion of cabinet E wherein fluid tank L could be used for gravity-fed dispensing of windshield washer solution P under low pressure. In an alternative embodiment, elevated fluid tank L could be used with regulator A11 or B11 and pump A13 or B13, while at the same time sharing the compressor K belonging to air/vacuum service unit X, to also dispense windshield washer solution P under low pressure. FIG. 8 shows separate hoses H connecting fluid tank L to solenoid A10, and solenoid A10 to nozzle A5. In FIG. 8, nozzle AS is also shown supported by holster A4. FIG. 8 further shows electrical enclosure I connected through the front surface of cabinet E, with electricity being supplied to electrical enclosure I and compressor K through power cord and plug F. Electrical enclosure I comprises coin slot A1, coin return A2, on-off light A3, and credit/debit card reader V. Although not shown in FIG. 8 and not critical, it is preferred that wiring J within electrical enclosure I be connected between step-down transformer A8 and timer A7 so that 24-volt electricity is used to activate timer A7 for adjustment of the time period during which windshield washer solution P is dispensed following coin insertion through coin slot A1.

To use the present invention, the person responsible for its maintenance (not shown) would place windshield washer solution P within fluid tank L, and connect power cord and plug F to a 120-volt power supply source (not shown). Then through adjustment of timers A7 and B7 and/or regulators A11 and B11, or both, the maintenance person would calibrate the system to have nozzles A5 and B5 dispense a predetermined amount of windshield washer solution P for a pre-set monetary charge. Thereafter, when an operator (not shown) lifts nozzle A5 or B5 from the respective holster A4 or B4, and places the distal end of nozzle A5 or B5 within the opening in a vehicle windshield washer fluid reservoir (not shown), and that operator further places a coin (not shown) in coin slot A1 or B1, or in the alternative places a credit or debit card (not shown) into card reader V, a pre-set amount of windshield washer solution P will be transferred into the vehicle reservoir without spilling and without use of a funnel. The respective on-off light A3 or B3 will become illuminated after coin or card insertion to confirm dispensing of windshield washer solution P. If the operator sees that the vehicle reservoir is nearly full and the respective on-off light A3 or B3 has not gone out, the operator can engage the cut-off control on the respective nozzle A5 or B5 until such time as the short dispensing period is completed to prevent overfilling and spillage. Upon completion of dispensing, the operator would replace the respective nozzle A5 or B5 within the respective holster A4 or B4. Thus, the present invention would provide neat, easy, and rapid use by an operator. Periodic maintenance of the present invention would entail refilling fluid tank L at regular intervals with windshield washer solution P, systematic re-calibration and documentation of the amount of windshield washer solution P dispensed per unit monetary charge, and the removal of coins and/or credit card receipts from electrical enclosure I, as needed.

What is claimed is:

1. A dispensing system for neatly transferring a metered quantity of windshield washer solution into a motor vehicle reservoir without spillage and without use of a funnel, said system comprising a cabinet made from strong, temper-resistant materials and having an outside surface; a fluid tank positioned within said cabinet, said fluid tank having at least one opening therethrough; an amount of said windshield washer solution, said amount being greater than said metered quantity, said windshield washer solution being positioned within said fluid tank; at least one dispensing gun having an elongated nozzle with a distal end, said distal end of said nozzle having a diameter sufficiently small to fit within the upper opening of most motor vehicle windshield washer fluid reservoirs, said dispensing gun comprising an easily operated manual fluid cut-off control; support means for supporting said dispensing gun during periods of non-use, said support means being attached to said outside surface of said cabinet; at least one solenoid positioned within said cabinet and configured so as to have an opened position and a closed position to control flow of said windshield washer solution between said fluid tank and said nozzle; low pressure transfer means of transporting said windshield washer solution between said solenoid and said nozzle; a first hose connected between said opening in said fluid tank and said solenoid; a second hose connected between said solenoid and said dispensing gun; a step-down transformer positioned within said cabinet; a power cord and plug having a distal end and a proximal end, said distal end being configured and dimensioned for connection to a remote power source, and said proximal end being connected through said cabinet to said transformer; a quantity of electrical wiring; metering means positioned within said cabinet and electrically connected with said wiring to said transformer, said metering means also being configured for use in establishing dispensing period during which each of said metered quantities of said windshield washer solution will be transferred to said dispensing gun and electrically connected with said wiring to said solenoid; payment accepting means attached to said cabinet and electrically connected with said wiring to both said metering means and to said transformer; and at least one on-off light electrically connected with said wiring to said metering means which when lit indicates to a system operator that said solenoid is in said opened position to allow flow of said windshield washer solution to said dispensing gun so that when a system operator places sufficient payment within said payment accepting means, said solenoid will be opened and said system operator can then manipulate said cut-off control on said dispensing gun to allow a selected amount of said metered quantity of said windshield washer solution to be neatly and gently transferred through said solenoid under low pressure and directly into a motor vehicle windshield washer fluid reservoir without spillage, without use of a funnel, and without overfill.

2. The system of claim 1 wherein said payment accepting means comprises at least one coin acceptor.

3. The system of claim 1 wherein said payment accepting means comprises at least one credit card reader.

4. The system of claim 1 wherein said gun support means comprises a holster configured and dimensioned for secure support of said dispensing gun and nozzle when said dispensing gun is not in use, and easy prompt release of said dispensing gun and nozzle for use when needed by a system operator.

5. The system of claim 1 wherein said low pressure transfer means comprises elevated placement of said fluid tank into a position higher than said nozzle so that when said solenoid is placed into said opened position, said windshield washer solution will be gravity fed into said nozzle for direct transfer into said motor vehicle windshield solution reservoir.

6. The system of claim 1 further comprising an air compressor and wherein said low pressure transfer means comprises a low pressure regulator, an adjustable regulator gauge attached to said low pressure regulator, a third hose, a fourth hose, and a pump; said air compressor being connected to said solenoid by said first hose so as to be in gaseous communication with said solenoid, said regulator and said pump being connected between said solenoid and said nozzle by said third hose so as to be in fluid communication with said solenoid and said nozzle, said pump being connected to said fluid tank by said fourth hose so as to be in fluid communication with said fluid tank, said pump also being configured to draw in both air provided by said air compressor and said metered quantity of said windshield washer solution from said fluid tank, and mix said air and said windshield washer solution evenly to provide a smooth even flow of said windshield washer solution through said nozzle.

7. The system of claim 1 wherein said power cord and plug is configured for connection to a remote 120-volt power supply, said step-down transformer comprises a capability for reducing current from 120-volts to 24-volts, and said metering means comprises a 24-volt adjustable timer.

8. The system of claim 5 wherein said payment accepting means and said on-off light are housed in an electrical enclosure and said electrical enclosure is attached to a wall positioned between adjacent motor vehicle servicing locations; said dispensing gun support means is also attached to said wall; said cabinet is positioned remotely from said dispensing gun support means; and said second hose is connected over said wall to said cabinet.

9. The system of claim 6 wherein said payment accepting means and said on-off light are housed in an electrical enclosure and said electrical enclosure is attached to a wall positioned between adjacent motor vehicle servicing locations; said dispensing gun support means is also attached to said wall; said cabinet is positioned remotely from said dispensing gun support means; and said third hose is connected over said wall to said cabinet.

10. The system of claim 5 further comprising a dispensing unit for air and vacuum services.

11. The system of claim 1 further comprising a housing used for dispensing air and vacuum services, said housing comprising an air compressor; wherein said cabinet is connected to said housing; and wherein said low pressure transfer means comprises a low pressure regulator, an adjustable regulator gauge attached to said low pressure regulator, a third hose, a fourth hose, and a pump; said air compressor of said housing being shared by said system, said air compressor being connected to said solenoid by said first hose so as to be in gaseous communication with said solenoid, said regulator and said pump being connected between said solenoid and said nozzle by said third hose so as to be in fluid communication with said solenoid and said nozzle, said pump being connected to said fluid tank by said fourth hose so as to be in fluid communication with said fluid tank, said pump also being configured to draw in both air provided by said air compressor and said metered quantity of said windshield washer solution from said fluid tank, and mix them evenly to provide a smooth even flow of said windshield washer solution through said nozzle.

12. A dispensing system for neatly transferring a metered quantity of windshield washer solution to a motor vehicle reservoir without spillage and without use of a funnel, said system comprising a cabinet made from strong tamper-resistant materials; a fluid tank positioned within said cabinet, said fluid tank having at least one opening therethrough; an amount of said windshield washer solution positioned within said fluid tank, said amount being greater than one of said metered quantities; a plurality of pumps positioned within said cabinet; a plurality of first hoses, one of said first hoses being connected between said opening in said fluid tank and each of said pumps; an air compressor; a plurality of solenoids positioned within said cabinet; a plurality of second hoses, one of said second hoses being connected between said air compressor and each of said solenoids; a plurality of low pressure regulators positioned within said cabinet; a plurality of connectors, one of said connectors being connected between each of said solenoids and one of said low pressure regulators; a plurality of third hoses, one of said third hoses being connected between each of said low pressure regulators and one of said pumps; a quantity of electrical wiring; a plurality of step-down transformers positioned within said cabinet, each of said transformers being electrically connected with said wiring to a different one of said solenoids; a plurality of dispensing guns each having an elongated nozzle with a distal end, each of said distal ends having a diameter sufficiently small to fit within the opening of most motor vehicle windshield washer fluid reservoirs; a plurality of fourth hoses, one of said fourth hoses being connected between each of said pumps and one of said dispensing guns; support means configured for supporting each of said dispensing guns during periods of non-use, said support means attached to said cabinet; a plurality of timers for establishing a dispensing period during which each of said metered quantities of said windshield washer solution will be dispensed from said nozzles, each of said timers being electrically connected with said wiring to a different one of said solenoids, each of said timers also being electrically connected with said wiring to one of said transformers; a plurality of on-off lights, each of said on-off lights being electrically connected with said wiring to one of said timers and to one of said transformers which when lit indicates to a system operator that the one of said solenoids connected to said lit on-off light is in an opened position to allow flow of said windshield washer solution through the one of said nozzles connected thereto; a plurality of payment accepting means, each of said payment accepting means being electrically connected with said wiring to both one of said transformers and one of said timers; and a power cord and plug having a distal end and a proximal end, said distal end of said power cord and plug being configured and dimensioned for connection to a remote power source, said proximal end of said power cord and plug being connected through said cabinet to said air compressor and each of said step-down transformers so that a system operator's placement of sufficient payment within said payment accepting means will cause the one of said solenoids connected to said payment accepting means receiving said payment to be placed in said opened position and allow flow of air from said air compressor through said low pressure regulator and into said pump, said pump will draw windshield washer solution from said fluid tank and send said metered quantity of said windshield washer solution evenly and smoothly into the one of said dispensing guns connected said pump so that said system operator can manipulate an easily operated manual fluid cut-off control on said dispensing gun to allow a selected amount of said metered windshield washer solution to be neatly and gently transferred under low pressure directly into a selected motor vehicle windshield washer fluid reservoir without spillage, without use of a funnel, and without overfill.

13. The system of claim 12 wherein said payment accepting means and said on-off lights are housed in an electrical enclosure and said electrical enclosure is attached to a wall positioned between adjacent motor vehicle servicing locations; said dispensing gun support means is also attached to said wall; said cabinet is positioned remotely from said dispensing gun support means; and said fourth hoses are connected over said wall to said cabinet.

14. The system of claim 12 further comprising a housing used for dispensing air and vacuum services, said housing comprising a housing air compressor; wherein said cabinet is connected to said housing; and wherein said system uses said housing air compressor as said air compressor to provide air to said plurality of solenoids, each of said low pressure regulators each of said pumps being connected between one of said solenoids and one of said dispensing guns so as to be in fluid communication with said solenoid and said dispensing gun, each of said pumps also being configured and connected to draw in both air provided by said housing air compressor and said metered quantity of said windshield washer solution from said fluid tank, and each of said pumps also being configured to mix said air and said windshield washer solution evenly to provide a smooth even flow of said windshield washer solution through said nozzle.

15. A method for metered dispensing of windshield washer solution, said method comprising the steps of providing a cabinet, a fluid tank, a power source, a plurality of step-down transformers, a plurality of payment acceptors, a plurality of on-off lights, a plurality of timers, a plurality of solenoids, a quantity of windshield washer solution, a plurality of hoses, a quantity of electrical wiring, a power cord and plug, and a plurality of dispensing guns each with an elongated nozzle and an easily operated fluid cut-off control; using said electrical wiring to connect a first one of said transformers to a first one of said payment acceptors, a first one of said timers, and a first one of solid solenoid; using said electrical wiring to connect a first one of said on-off lights to a first one of said timers; placing said first transformer, said first timer, said first on-off light, and said first payment acceptor within said cabinet; also placing said fluid tank into an elevated position within said cabinet; using a first one of said hoses to connect said first solenoid to said fluid tank and place said first solenoid in fluid communication with said fluid tank; using a second one of said hoses to connect first solenoid to a first one of said dispensing guns; adjusting said first timer to define a dispensing period within which said first dispensing gun is able to transfer a desired amount of said windshield washer solution; using said power cord and plug to connect said power source to said first step-down transformer so that an operator's placement of a predetermined amount of payment into said first payment acceptor will activate said first timer and illuminate said first on-off light, said first timer will open said first solenoid for said dispensing period, said first solenoid will allow flow of said metered quantity of said windshield washer solution through said first dispensing gun, said flow being controllable by said operator who can promptly stop said flow by manipulation of said cut-off control on said dispensing gun; and the steps of connecting the remaining ones of said plurality of transformers, said plurality of timers, said plurality of payment acceptors, said plurality of solenoids, and said plurality of hoses in a like manner to said connection of said first transformer, said first timer, said first payment acceptor, said first solenoid, and said first and second hoses to provide simultaneous metered dispensing of said windshield washer solution to more than one system operator.

16. The method of claim 15 further comprising said steps of providing a plurality of low pressure regulators, a plurality of adjustable regulator gauges, a plurality of pumps, and an air compressor; placing said low pressure regulators, said adjustable regulator gauges, said pumps, and said air compressor within said cabinet; connecting said power plug and cord to said air compressor; using said first hose to connect said first solenoid to said air compressor; connecting said first solenoid to a first one of said low pressure regulators; connecting said first low pressure regulator to a first one of said adjustable regulator gauges; using a third one of said hoses to connect said low pressure regulator to a first one of said pumps; using a fourth one of said hoses to connect said first pump to said fluid tank to place said first pump in fluid communication with said fluid tank; adjusting both said first timer and said first regulator gauge to establish said dispensing period within which said desired amount of said windshield washer solution is transferred to said nozzle so that said operator's placement of said predetermined amount of payment into said first payment acceptor will cause said first solenoid to draw air from said air compressor, allow said air to flow through said first low pressure regulator and into said first pump, cause said first pump to draw said metered quantity of said windshield washer solution from said fluid tank and transfer both said air and said metered quantity of said windshield washer solution smoothly and evenly to said first dispensing gun; and connecting the remainder of said low pressure regulators, said adjustable regulator gauges, said hoses, and said pumps in a like manner to said connection of said first low pressure regulator, said first adjustable regulator gauge, said first pump, and said first, second, third and fourth hoses to provide simultaneous metered dispensing of said windshield washer solution to more than one operator.

17. The method of claim 15 further comprising the steps of providing a plurality of electrical enclosures, a plurality of walls between adjacent motor vehicle servicing locations, and a plurality of dispensing gun support means; attaching each of said electrical enclosures to one of said walls; placing said on-off lights and said payment acceptors within said electrical enclosures to provide an identical number of said on-off lights and said payment acceptors within each of said electrical enclosures; also attaching said dispensing gun support means to said walls so that at least one of said dispensing gun support means is attached to each of said walls; remotely placing said cabinet from each of said dispensing gun support means; and connecting each of said second hoses over said walls to one of said solenoids in said cabinet.

18. The method of claim 16 further comprising the steps of providing a plurality of electrical enclosures, a plurality of walls between adjacent motor vehicle servicing locations, and a plurality of dispensing gun support means; attaching each of said electrical enclosures to one of said walls; placing said on-off lights and said payment acceptors within said electrical enclosures to provide an identical number of said on-off lights and said payment acceptors within each of said electrical enclosures; also attaching said dispensing gun support means to said walls so that at least one of said dispensing gun support means is attached to each of said walls; remotely placing said cabinet from each of said dispensing gun support means; and connecting each of said second hoses over said walls to one of said solenoids in said cabinet.

19. The method of claim 15 further comprising the step of providing a dispensing unit for air and vacuum services and the step of merging said cabinet with said dispensing unit to provide a combination air services, vacuum services, and windshield washer solution dispensing services structure.

20. The method of claim 15 further comprising said steps of providing a housing having an air compressor for dispensing air and vacuum services, a plurality of low pressure regulators, a plurality of adjustable regulator gauges, and a plurality of pumps; placing said low pressure regulators, said adjustable regulator gauges, and said pumps within said cabinet; attaching said cabinet to said housing; using said first hose to connect said first solenoid to said air compressor in said housing; connecting said first solenoid to a first one of said low pressure regulators; connecting said first low pressure regulator to a first one of said adjustable regulator gauges; using a third one of said hoses to connect said first low pressure regulator to a first one of said pumps; using a fourth one of said hoses to connect said first pump to said fluid tank to place said first pump in fluid communication with said fluid tank; adjusting both said first timer and said first regulator gauge to establish said dispensing period within which said desired amount of windshield washer solution will be transferred to said nozzle so that said operator's placement of said predetermined amount of payment into said first payment acceptor will cause said solenoid to draw air from said air compressor in said housing, allow said air to flow through said first low pressure regulator and into said first pump, cause said first pump with draw said metered quantity of said windshield washer solution, and cause said first pump to smoothly and evenly transfer said metered quantity of said windshield washer solution to said first dispensing gun; and connecting the remainder of said low pressure regulators, said adjustable regulator gauges, and said pumps in a like manner to said connection of said first low pressure regulator, said first adjustable regulator gauge, said first pump, and said first, second, third, and fourth hoses to provide simultaneous metered dispensing of said windshield washer solution to more than one system operator.

* * * * *

UNITED STATES PATENT AND TRADEMARK OFFICE
CERTIFICATE OF CORRECTION

PATENT NO. : 5,957,329
DATED : 9-28-99
INVENTOR(S) : David J. Kenney et al.

It is certified that error appears in the above-identified patent and that said Letters Patent is hereby corrected as shown below:

Column 5, line 17 – "gravity fed" – hyphen deleted

Column 11, line 10 – "AS" – should be "A5"

Column 14, line 30 – "and to one of said transformers" – surplus language – the inventors asked that it be deleted by amendment Column 15, line 29 – "solid solenoid" – should be "said solenoids"

Signed and Sealed this

Twenty-second Day of August, 2000

Q. TODD DICKINSON

Attest:

Attesting Officer

Director of Patents and Trademarks